United States Patent [19]
Takanashi et al.

[11] Patent Number: 5,430,705
[45] Date of Patent: Jul. 4, 1995

[54] METHOD AND APPARATUS FOR RECORDING AND REPRODUCING MAIN AND SUB INFORMATION

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 676,505

[22] Filed: Mar. 28, 1991

[30] Foreign Application Priority Data

| Apr. 2, 1990 | [JP] | Japan | 2-88069 |
| Apr. 2, 1990 | [JP] | Japan | 2-88070 |
| May 31, 1990 | [JP] | Japan | 2-143016 |
| May 31, 1990 | [JP] | Japan | 2-143017 |

[51] Int. Cl.[6] .................. G11B 9/00; G03B 31/00
[52] U.S. Cl. ......................... 369/126; 360/3; 358/345
[58] Field of Search ............. 369/121, 108, 126, 125, 369/111; 360/3, 19.1; 358/166, 195, 341, 345, 213.13, 204; 350/361, 103; 359/3, 530; 346/107 R

[56] References Cited

U.S. PATENT DOCUMENTS

| 3,508,817 | 4/1970 | Hnilicka, Jr. | 369/108 |
| 3,534,166 | 10/1970 | Korpel | 369/308 |
| 3,902,010 | 8/1975 | Goshima | 369/121 |
| 4,219,704 | 8/1980 | Russell | 369/308 |
| 4,388,655 | 6/1983 | Zenzefilis | 360/19.1 |
| 4,515,462 | 5/1985 | Yoneda | 355/4 |
| 4,651,313 | 3/1987 | Guez | 369/125 |
| 4,945,423 | 7/1990 | Takanashi et al. | 358/233 |
| 5,012,351 | 4/1991 | Isono et al. | 358/341 |
| 5,027,216 | 6/1991 | Takanashi et al. | 358/213.11 |
| 5,055,936 | 10/1991 | Takanashi et al. | 359/245 |
| 5,087,539 | 2/1992 | Takanashi et al. | 430/48 |
| 5,101,397 | 3/1992 | Banjo | 369/125 |
| 5,130,812 | 7/1992 | Yamaoka | 358/341 |
| 5,161,233 | 11/1992 | Matsuo et al. | 355/217 |

FOREIGN PATENT DOCUMENTS

| 0201391 | 11/1986 | European Pat. Off. |
| 0282611 | 9/1988 | European Pat. Off. |
| 0342967 | 11/1989 | European Pat. Off. |
| 0342968 | 11/1989 | European Pat. Off. |
| 0369794 | 5/1990 | European Pat. Off. |
| 2-222924 | 9/1990 | Japan |
| 2-306790 | 12/1990 | Japan |

*Primary Examiner*—Georgia Y. Epps
*Assistant Examiner*—Nabil Hindi
*Attorney, Agent, or Firm*—Lowe, Price, LeBlanc & Becker

[57] ABSTRACT

In an information recording apparatus, light containing information to be recorded is generated, and a photo-to-electric converting device serves to convert the light into a charge latent image. The photo-to-electric converting device includes a photoconductive member exposed to the light. Information corresponding to the charge latent image is recorded on a recording medium. A first recording device serves to record main information on a first region of the recording medium. A second recording device separate from the first recording device serves to record sub information on a second region of the recording medium. The second region is different from the first region.

2 Claims, 13 Drawing Sheets

METHOD AND APPARATUS FOR RECORDING AND REPRODUCING MAIN AND SUB INFORMATION

BACKGROUND OF THE INVENTION

This invention relates to a method and an apparatus for recording and reproducing main and sub information. For example, the main information is video information, and the sub information is audio information.

New technologies have been developed in the field of recording and reproducing information. According to one known example of an information recording system based on such new technologies, light representing information to be recorded is applied to a photoelectric transducer device including a photoconductive member, and the information is recorded by the photoelectric transducer device on a recording medium including a photo-modulation member or a charge holding member.

SUMMARY OF THE INVENTION

It is an object of this invention to provide an improved apparatus for recording and reproducing main and sub information.

It is another object of this invention to provide an improved method of recording and reproducing main and sub information.

A first aspect of this invention provides an information recording apparatus comprising means for generating light containing information to be recorded; photo-to-electric converting means for converting the light into a charge latent image, the photo-to-electric converting means including a photoconductive member exposed to the light; and means for recording information corresponding to the charge latent image on a recording medium; the improvement comprising first recording means for recording main information on a first region of the recording medium; and second recording means, separate from the first recording means, for recording sub information on a second region of the recording medium, the second region being different from the first region.

A second aspect of this invention provides an information recording and reproducing apparatus comprising means for generating light containing information to be recorded; photo-to-electric converting means for converting the light into a charge latent image, the photo-to-electric converting means including a photoconductive member exposed to the light; means for recording information corresponding to the charge latent image on a recording medium; and means for reproducing the information from the recording medium; the improvement comprising first recording means for recording main information on a first region of the recording medium; second recording means, separate from the first recording means, for recording sub information on a second region of the recording medium, the second region being different from the first region; and common means for reproducing the main information and the sub information from the recording medium.

A third aspect of this invention provides an information recording apparatus comprising a recording member having a first portion for storing main information and a second portion for storing sub information; and a frequency-separation filter extending over the first portion of the recording member; wherein the second portion of the recording member is uncovered from the frequency-separation filter.

A fourth aspect of this invention provides a method comprising the steps of recording main information on a recording member; generating first light and second light having a first frequency and a second frequency which correspond to selection frequencies of a frequency separation optical filter respectively; representing first sub information by the first light; representing second sub information by the second light; combining the first light and the second light into composite light and multiplexing the first sub information and the second sub information; passing the composite light through the frequency separation filter; and recording the first sub information and the second sub information on the recording medium in response to the composite light which exits from the frequency separation filter.

A fifth aspect of this invention provides an information recording apparatus comprising means for generating light containing information to be recorded; photo-to-electric converting means for converting the light into a charge latent image; and means for recording information corresponding to the charge latent image on a recording medium; the improvement comprising first recording means for recording main information on a first region of the recording medium; second recording means, separate from the first recording means, for recording sub information on a second region of the recording medium, the second region being different from the first region; means for moving the recording medium; and means for activating the second recording means when the recording medium is moved by the moving means.

A sixth aspect of this invention provides an information recording and reproducing apparatus comprising means for generating light containing information to be recorded; photo-to-electric converting means for converting the light into a charge latent image; means for recording information corresponding to the charge latent image on a recording medium; and means for reproducing the information from the recording medium; the improvement comprising first recording means for recording main information on a first region of the recording medium; second recording means, separate from the first recording means, for recording sub information on a second region of the recording medium, the second region being different from the first region; means for moving the recording medium; and means for reproducing the sub information when the recording medium is moved by the moving means.

DESCRIPTION OF THE PREFERRED EMBODIMENTS

Recording systems of FIGS. 1–4 include a lens TL, a recording medium RM, a transparent base plate BP1 (for example, a glass plate), a base plate BP2, a transparent electrode Et1, an electrode Et2, a photoconductive layer PCL, a recording layer CML of the recording medium RM, an electric power source E, an optical shutter PS, a switch SW (an electronic shutter), a resistor R, and a writing head WH.

Figure 1:
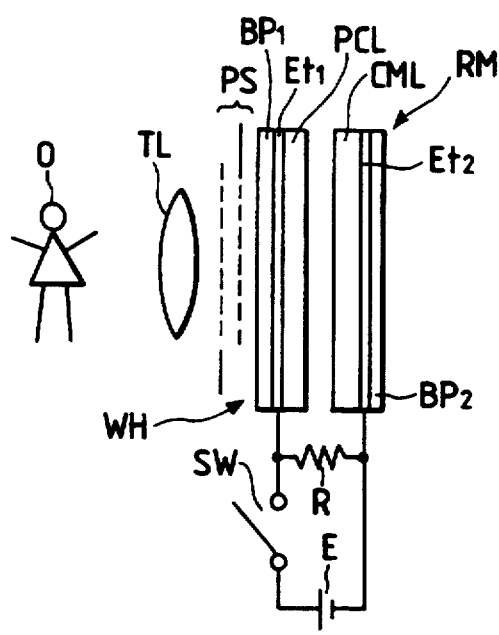
FIGS. 1–4 are diagrams of recording systems.
Figure 2:
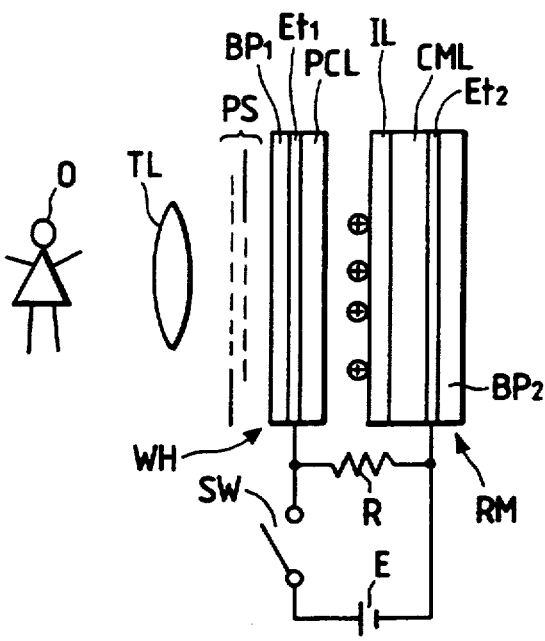
Figure 3:
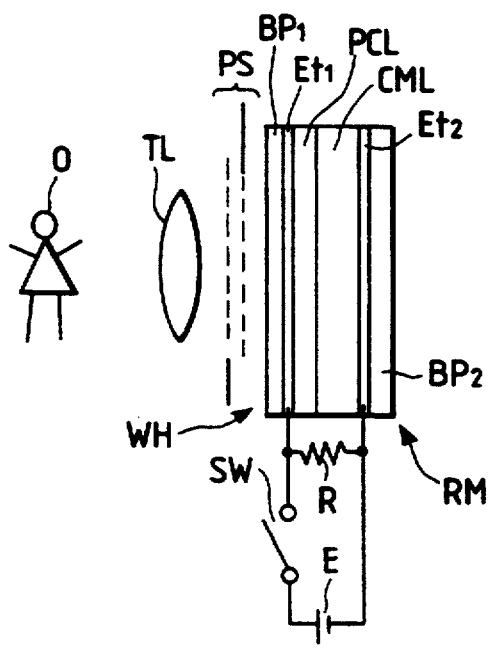

In the recording systems of FIG. 1–3, the recording layer CML of the recording medium RM is made of a photo-modulation layer. In the recording system of FIG. 4, the recording layer CML of the recording medium RM is made of a charge holding layer.

The recording layer CML is made of various materials such as silicone resin, liquid crystal, PLZT, electrochromic substances. The recording layer CML may be composed of a complex film of high molecular material and liquid crystal material. In the complex film, the liquid crystal is dispersed or impregnated in the high molecular material. It is preferable that the high molecular material has a volume resistivity of $10^{14}$ $\Omega$ cm or higher. The high molecular material is selected from various substances such as methacrylic resin, polyester resin, polycarbonate resin, vinyl chloride resin, polyamide resin, polyethylene resin, polypropylene resin, polystyrene resin, and silicone resin. The liquid crystal is selected from various substances such as smectic liquid crystal and nematic liquid crystal which assume a phase exhibiting characters of liquid crystal at a room temperature.

Figure 4:
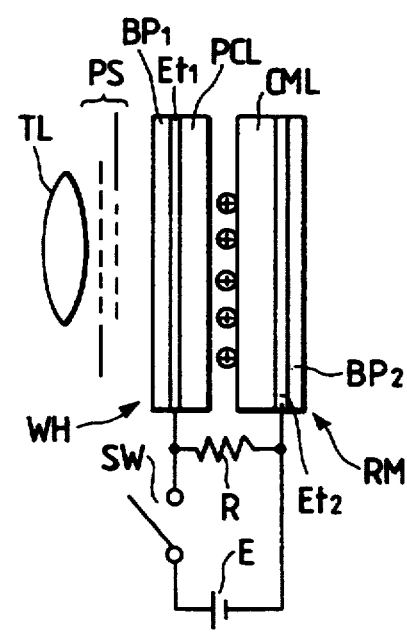

In the recording system of FIGS. 1 and 4, the recording medium RM has a laminated structure including the base plate BP2, the electrode Et2, and the recording layer CML. In the recording system of FIG. 2, the recording medium RM has a laminated structure including the base plate BP2, the electrode Et2, the recording layer CML, and an insulating layer IL. In the recording system of FIG. 3, the recording medium RM has a laminated structure including the base plate BP2, the electrode Et2, the recording layer CML, the photoconductive layer PCL, the transparent electrode Et1, and the base plate BP1.

The recording medium RM has an arbitrary shape for example, a disk shape, a tape shape, or a sheet shape. The recording medium RM can be moved by a suitable drive device (not shown).

The electric power source E is connected between the transparent electrode Et1 and the electrode Et2 via the switch SW. When the switch SW is closed, a given electric field is generated between the transparent electrode Et1 and the electrode Et2. The switch SW forms an electronic shutter which is controlled in compliance with recording conditions of the recording medium RM. The amount of light from an object 0 is controlled by the optical shutter PS so that the recording of an image of the object 0 can be performed under good light exposure conditions.

The transparent electrode Et1 is made of, for example, ITO (indium tin oxide). The photoconductive layer PCL is made of, for example, amorphous silicon.

The writing head WH has a laminated structure including the base plate BP1, the transparent electrode Et1, and the photoconductive layer PCL.

In the recording systems of FIGS. 1–4, when the optical shutter PS is opened, the lens TL enables the optical image of the object 0 to be formed on the photoconductive layer PCL via the transparent electrode Et1. Under conditions where the switch SW is closed so that the given potential is applied between the transparent electrode Et1 and the electrode Et2 by the electric power source E, information corresponding to the optical image of the object 0 on the photoconductive layer PCL is recorded on the recording layer CML of the recording medium RM. Specifically, a two-dimensional distribution of the electric resistance of the photoconductive layer PCL is caused in response to the two-dimensional distribution of the intensity of the light of the image on the photoconductive layer PCL. The electric field is varied in accordance with the two-dimensional distribution of the electric resistance of the photoconductive layer PCL, and the information represented by the electric field is transferred to the recording layer CML of the recording medium RM.

In the recording systems of FIGS. 1, 2, and 4, the photoconductive layer PCL of the recording head WH opposes the recording medium RM. In the recording system of FIG. 3, the photoconductive layer PCL is used as one of the structural elements of the recording medium RM.

In the recording systems of FIGS. 1 and 2, the two-dimensional distribution of the electric resistance of the photoconductive layer PCL causes corresponding modulation of the electric field, and optical conditions of the recording medium RM are varied in accordance with the modulated electric field so that the information represented by the modulated electric field is transferred to the recording medium RM. In the recording system of FIG. 4, there is a gap between the photoconductive layer PCL and the recording medium RM. The two-dimensional distribution of the electric resistance of the photoconductive layer PCL causes corresponding modulation of the electric field, and a charge latent image is generated on the recording medium RM in response to the modulated electric field through a discharging process. In the recording system of FIG. 3, there is no gap between the photoconductive layer PCL and the recording medium RM. The two-dimensional distribution of the electric resistance of the photoconductive layer PCL causes corresponding modulation of the electric field, and optical conditions of the recording medium RM are varied in accordance with the modulated electric field so that the information represented by the modulated electric field is transferred to the recording medium RM.

Figure 5:
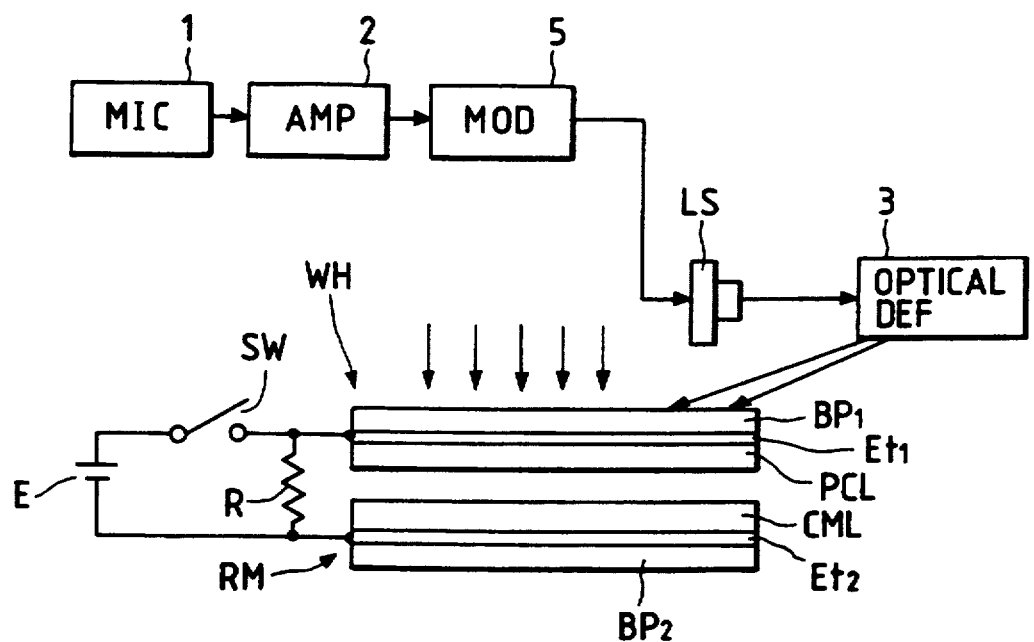
FIG. 5 is a diagram of a recording system according to an embodiment of this invention.

In a recording system of FIG. 5, a microphone 1 outputs an audio signal fed to a modulator 5 via an amplifier 2. The modulator 5 uses the audio signal as a modulating wave (a signal wave), performing amplitude modulation, frequency modulation, or pulse code modulation on a carrier in response to the modulating wave. The output signal from the modulator 5 is fed to a light source LS. The light source LS emits audio-information light in response to the output signal from the modulator 5, and the light is applied to an optical deflector 3. The optical deflector 3 deflects the audio-information light, applying the light to the segment of a writing head WH which opposes an audio-information recording region of a recording medium RM. The writing head WH records the audio-information on the audio-information recording region of the recording medium RM. Video information is recorded on a video-information recording region of the recording medium RM by an optical-information recording arrangement similar to one of the recording systems of FIGS. 1-4.

The recording system of FIG. 5 features the following points. The video information and the audio information are recorded on different regions of the recording medium RM respectively. During the recording of the audio information, the audio-information light is deflected by the optical deflector 3 so that the audio-information recording region of the recording medium RM will be scanned by the audio-information light in a predetermined scanning format. For example, the recording medium RM is scanned by the audio-information light in a manner such that the audio information will be recorded on the recording medium RM in a bit-by-bit manner. To increase the recording density, the pattern of the recording light may be modulated with a plurality of bits of audio information so that a plurality of bits of the audio information can be simultaneously recorded. In the latter case, the light source LS is preferably composed of an LED, an electric bulb, or others which generate incoherent light. This is because if the recording light was coherent, an intensity variation might occur in a part of the pattern of the recording light due to interference and the intensity variation might cause a bit error.

In the recording system of FIG. 5, the recording medium RM has a card shape where one card corresponds to one picture, a card shape where one card corresponds to a plurality of pictures, an elongated film shape, or a disk shape.

Figure 6:
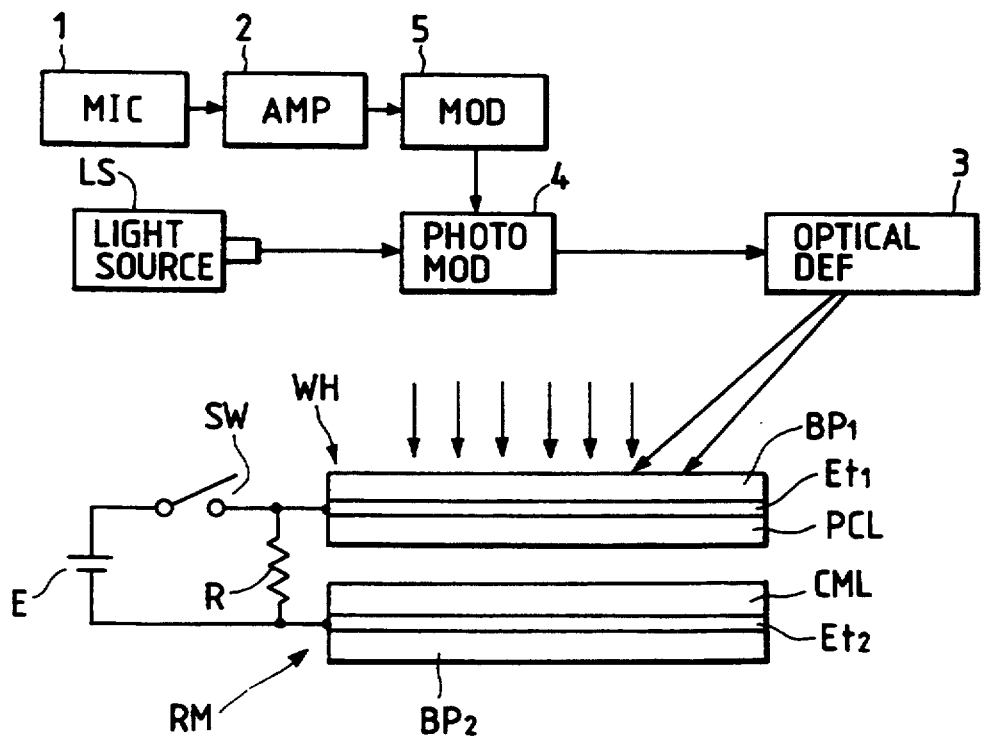
FIG. 6 is a diagram of a recording system according to an embodiment of this invention.
Figure 7:
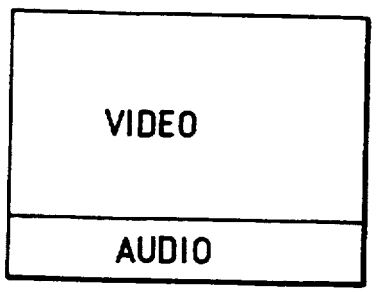
FIGS. 7–10 are diagrams showing video-information recording regions and audio-information recording regions.

A recording system of FIG. 6 is similar to the recording system of FIG. 5 except that the modulation of the light from a light source LS is realized by an optical modulator 4 which responds to the output signal from a modulator 5 and which is disposed between the light source LS and an optical deflector 3. It should be noted that the modulator 5 may be omitted.

Figure 8:
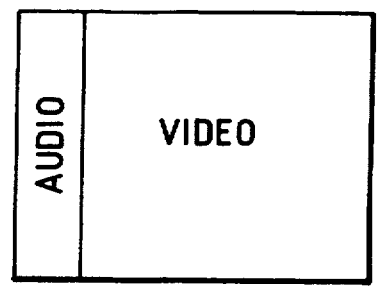
Figure 9:
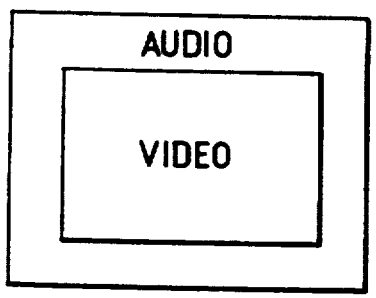
Figure 10:
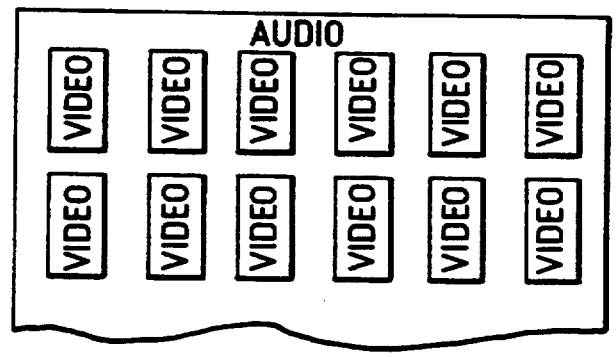

In the recording systems of FIGS. 5 and 8, the video-information recording region and the audio-information recording region of the recording medium RM are arranged in a predetermined manner such as shown in one of FIGS. 7-10.

Figure 11:
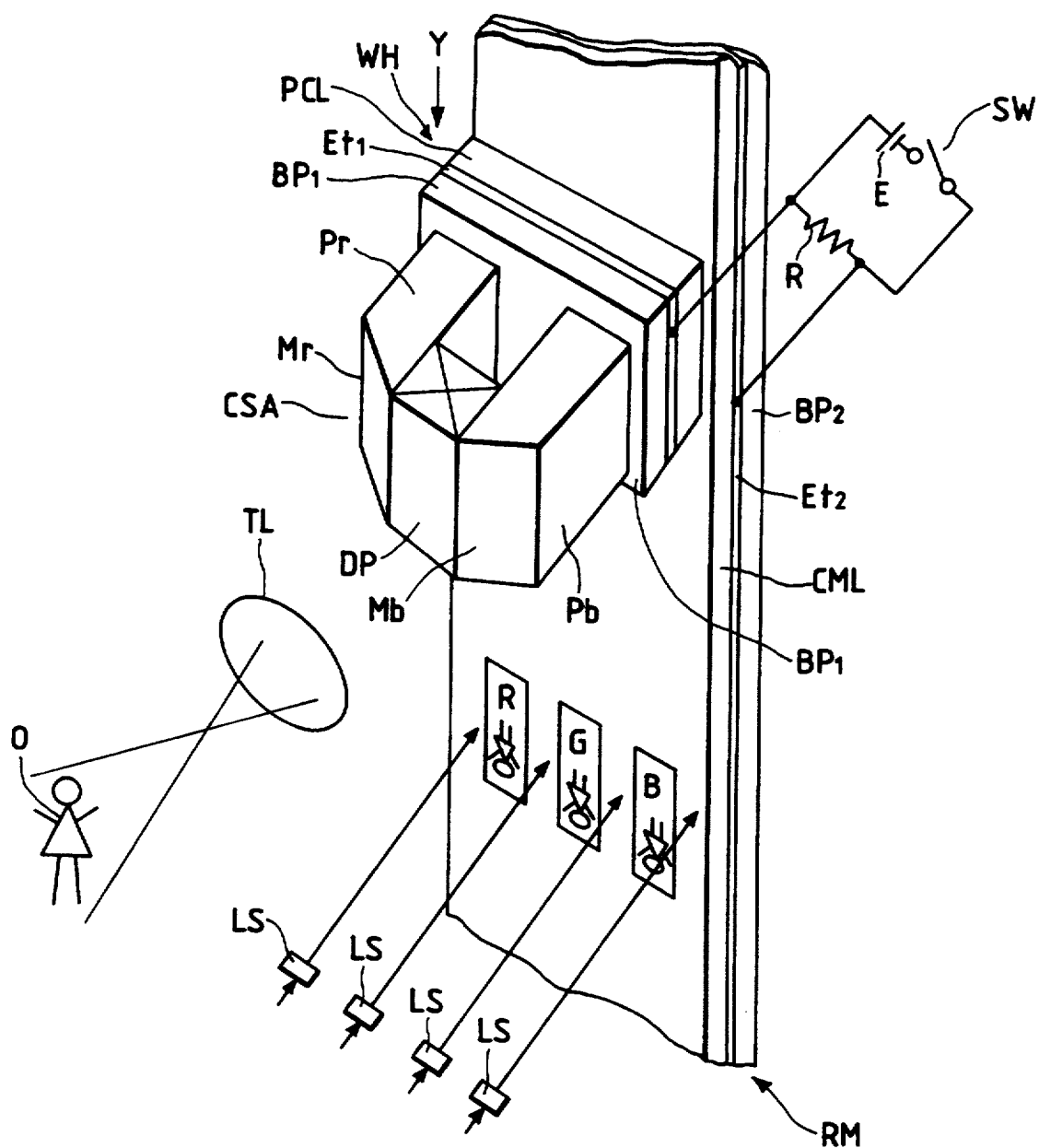
FIG. 11 is a diagram of a recording system according to an embodiment of this invention.

In a recording system of FIG. 11, a lens TL, an optical color separator CSA, a writing head WH, and a recording medium RM are arranged in the order along a direction of travel of light representing a scene of an object 0, the image of which is to be recorded. The light representing the scene of the object 0 travels to the optical color separator CSA via the lens TL. The optical color separator CSA includes a dichroic mirror or a dichroic prism Dp extending between prisms Pr and Pb having respective total reflection surfaces Mr and Mb. The dichroic prism Dp includes a mirror or an R surface reflecting red light but conducting green and blue light, and a mirror or a B surface reflecting blue light but conducting green and red light. The R surface and the B surface are perpendicular to each other. When the light from the object 0 is incident to the dichroic prism Dp of the optical color separator CSA, green components of the incident light pass through the dichroic prism Dp and form a green image of the object 0 on the writing head WH. Red components of the light are reflected by the R surface of the dichroic prism Dp and are then reflected by the total reflection surface Mr of the prism Pt, forming a red image of the object 0 on the writing head WH. Blue components of the light are reflected by the B surface of the dichroic prism Dp and are then reflected by the total reflection surface Mb of the prism Pb, forming a blue image of the object 0 on the writing head WH. In this way, red, green, and blue images of the object 0 are formed on separate regions of the writing head WH respectively.

In the recording system of FIG. 11, the writing head WH has a laminated structure off a transparent base plate (for example, a glass base plate) BP1, a transparent electrode Et1, and a photoconductive layer PCL which are arranged in the order along the direction of the travel of the light. The transparent electrode Et1 is made of, for example, ITO (indium tin oxide). The photoconductive layer PCL is made of, for example, amorphous silicon. The photoconductive layer PCL is exposed to the red image, the green image, and the blue image of the object 0 via the transparent base plate BF1 and the transparent electrode Et1.

In the recording system of FIG. 11, the recording medium RM has a laminated structure of a recording layer CML, an electrode Et2, and a base plate BP2 which are arranged in the order. The recording layer CML of the recording medium RM opposes the photoconductive layer PCL of the writing head WH. The recording layer CML is made of various materials such as those in the recording systems of FIGS. 1-4.

The transparent electrode Et1 is electrically connected to the positive terminal of a dc power source E. The electrode Et2 is electrically connected to the negative terminal of the dc power source E via a switch SW. A resistor R is electrically connected between the transparent electrode Et1 and the electrode Et2. When the switch SW is closed, a predetermined dc voltage is applied between the electrodes Et1 and Et2 by the dc power source E so that an electric field of a predetermined intensity can be generated between the electrodes Et1 and Et2. The dc voltage applied between the electrodes Et1 and Et2 is set slightly lower than a voltage at which a space discharge between the photoconductive layer PCL and the recording layer CML starts to occur.

Under conditions where the switch SW is closed, the three color images of the object 0 are formed on the photoconductive layer PCL of the writing head WH and the electric field is generated between the electrodes Et1 and Et2. The electric resistance of the photoconductive layer PCL varies with the three color images of the object 0. Thus, a two-dimensional distribution of the electric field in the gap between the photoconductive layer PCL of the writing head WH and the recording layer CML of the recording medium RM varies in accordance with the three color images of the object 0. In the case where the recording layer CML is made of charge holding material, a space discharge occurs across the gap between the photoconductive layer PCL and the recording layer CML in response to the electric field, so that charge latent images corresponding to the three color images are formed on the recording layer CML of the recording medium RM. In the case where the recording layer CML is made of photo-modulation material, optical conditions of the recording layer CML are varied in response to the electric field, so that the information corresponding to the three color images are transferred from the electric field to the recording layer CML.

The recording medium RM can be moved relative to the writing head WH in a direction Y by a known drive mechanism (not shown).

When the switch SW is opened and the application of the dc voltage between the electrodes Et1 and Et2 is removed, the formation of the three color images on the photoconductive layer PCL of the writing head WH is inhibited. Thus, the switch SW serves as an electronic shutter. The switch SW is periodically closed and opened. The period during which the switch SW is closed is chosen in dependence on the recording characteristics of the recording layer CML of the recording medium RM so as to enable good recording of the information on the recording layer CML.

In general, recorded information on the recording layer CML of the recording medium RM tend to be deteriorated by charges staying in a capacitance between the electrodes Et1 and Et2. In the recording system of FIG. 11, while the switch SW remains open, the electrodes Et1 and Et2 are connected via a low impedance determined by the resistor R. The connection between the electrodes Et1 and Et2 via the low impedance prevents charges from staying in the capacitance between the electrodes Et1 and Et2, so that the deterioration of the recorded information on the recording layer CML of the recording medium RM can be prevented.

In the recording system of FIG. 11, the red-information recording region, the green-information recording region, and the blue-information recording region of the recording medium RM are separated by guard bands. In addition, guard bands are provided outward of the red-information recording region and the blue-information recording region of the recording medium RM. Light sources LS emit respective light beams, the intensities of which are varied in accordance with audio information as in the recording system of FIG. 5. The audio-information light beams are applied to the regions of the writing head WH which correspond to the guard bands while the audio-information light beams scan the guard-band corresponding regions of the writing head WH. As a result, the audio information is recorded on the guard bands of the recording medium RM. The scanning of the guard bands by the audio-information light beams is realized by the motion of the recording medium RM relative to the writing head WH in the direction Y.

In the recording system of FIG. 11, since the light scattered from the object 0 is focused by the lens TL, each of the light representing the red image, the light representing the green image, and the light representing the blue image is composed of non-parallel light. The guard bands among the red-information recording region, the green-information recording region, and the blue-information recording region of the recording medium RM prevent crosstalks among the red information, the green information, and the blue information which might be caused by the non-parallel light. On the other hand, each of the audio-information light beams applied to the writing head WH is composed of parallel light. Accordingly, the audio-information light beams can be prevented from entering the regions of the writing head WH which oppose the video-information recording regions of the recording medium RM. In other words, the audio-information light beams can be accurately applied to the regions of the writing head WH which correspond to the guard bands.

Figure 12:
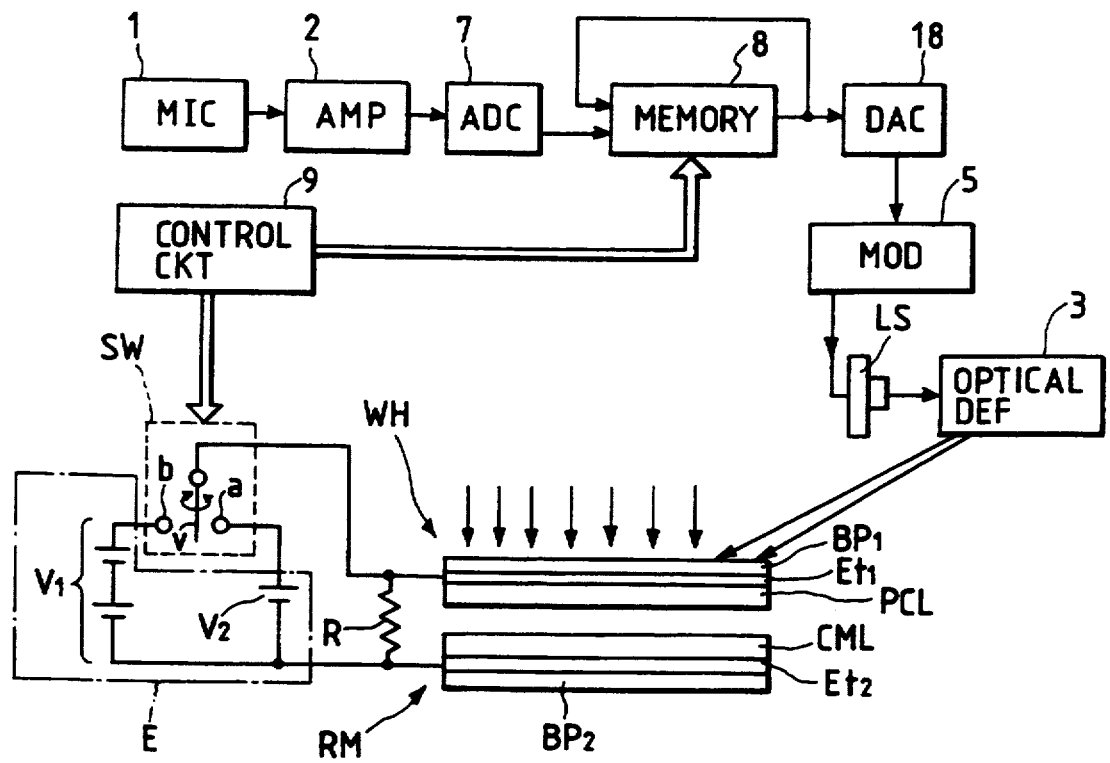
FIG. 12 is a diagram of a recording system according to an embodiment of this invention.

In a recording system of FIG. 12, a microphone 1 outputs an an analog audio signal which is fed to an analog-to-digital converter 7 via an amplifier 2. The analog audio information signal is converted by the analog-to-digital converter 7 into a corresponding digital audio-information signal. The digital audio-information signal is fed to a circulating memory 8. The circulating memory 8 circularly memorizes a predetermined time segment of the digital audio-information in response to a writing pulse fed from a control circuit 9. The digital audio-information is read out from the circulating memory 8 in response to a reading pulse fed from the control circuit 9. The digital audio-information is fed from the circulating memory 8 to a digital-to-analog converter 18, being converted by the digital-to-analog converter 18 into a corresponding analog audio-information. The analog audio-information is fed from the digital-to-analog converter 18 to a modulator 5. The modulator 5 uses the analog audio-information as a modulating wave (a signal wave), performing amplitude modulation, frequency modulation, or pulse code modulation on a carrier in response to the modulating wave. The output signal from the modulator 5 is fed to a light source LS. The light source LS emits audio-information light in response to the output signal from the modulator 5, and the audio-information light is applied to an optical deflector 3. The optical deflector 3 deflects the audio-information light, applying the light to the segment of a writing head WH which opposes an audio-information recording region of a recording medium RM. The writing head WH records the audio information on the audio-information recording region of the recording medium RM. Video information is recorded on a video-information recording region of the recording medium RM by an optical-information recording arrangement similar to one of the recording systems of FIGS. 1–4, and 11.

In the recording system of FIG. 12, the video information and the audio information are recorded on different regions of the recording medium RM respectively. During the recording of the audio information, the audio-information light is deflected by the optical deflector 3 so that the audio-information recording region of the recording medium RM will be scanned by the audio-information light in a predetermined scanning format.

In the recording system of FIG. 12, an electric power source E includes a high voltage source V1 and a low voltage source V2. A transparent electrode Et1 in the writing head WH is electrically connected to a movable contact "v" of a switch SW. The movable contact "v" of the switch SW is connected to one of fixed contacts "a" and "b" of the switch SW or disconnected from both of the fixed contacts "a" and "b". The fixed contacts "a" and "b" of the switch SW arc connected to the positive terminals of the low voltage source V2 and the high voltage source V1 respectively. The negative terminals of the high voltage source V1 and the low voltage source V2 are electrically connected to an electrode Et2 in the recording medium RM. A resistor R is electrically connected between the electrodes Et1 and Et2. The switch SW is controlled by an output signal from the control circuit 9. When the movable contact "v" of the switch SW is connected to the fixed contact "a" of the switch SW in response to the output signal from the control circuit 9, a low voltage is applied between the electrodes Et1 and Et2 by the low voltage source V2. When the movable contact "v" of the switch SW is connected to the fixed contact "b" of the switch SW in response to the output signal from the control circuit 9, a high voltage is applied between the electrodes Et1 and Et2 by the high voltage source V1. When the movable contact "v" of the switch SW is disconnected from both of the fixed contacts "a" and "b" of the switch SW in response to the output signal from the control circuit 9, the application of the voltage between the electrodes Et1 and Et2 is inhibited.

Figure 13:
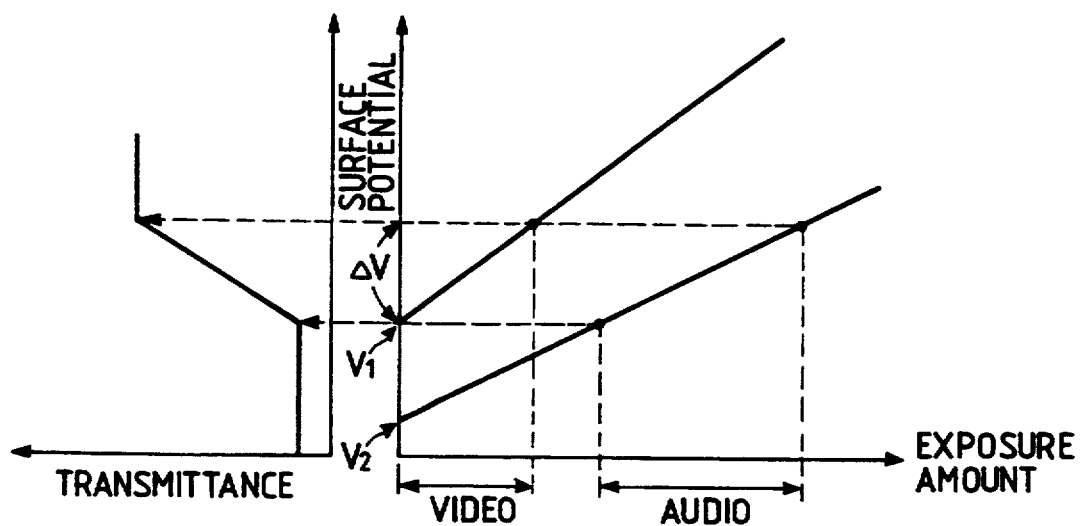
FIG. 13 is a diagram showing the relation between the exposure light quantity and the surface potential of a photoconductive layer in the writing head with the applied voltage being used as a parameter, and also showing the relation between the applied voltage and the transmittance of the photoconductive layer in the recording system of FIG. 12.

Conditions of the recording of video information are different from conditions of the recording of audio information. For example, the recording of video information is executed simultaneously for a two-dimensional region whereas the recording of audio information is executed by a one-dimensional scanning process. In view of the difference in recording conditions between the video information and the audio information, the voltage applied between the electrodes Et1 and Et2 for recording the video information is set different from the voltage applied between the electrodes Et1 and Et2 for recording the audio information. In addition, the quantity of the exposure light for recording the video information is set different from the quantity of the exposure light for recording the audio information. The right-hand side of FIG. 13 shows the relation between the exposure light quantity and the surface potential of a photoconductive layer PCL in the writing head WH with the applied voltage being used as a parameter. The left-hand side of FIG. 13 shows the relation between the applied voltage and the transmittance of the photoconductive layer PCL. The voltage applied between the electrodes Et1 and Et2 for recording the video information and the voltage applied between the electrodes Et1 and Et2 for recording the audio information are set to levels denoted by the characters V1 and V2 respectively in FIG. 13. In addition, the quantity of the exposure light for recording the video information and the quantity of the exposure light for recording the audio information are set in predetermined ranges such as shown in FIG. 13. It should be noted that an exposure light quantity equals a light quantity multiplied by an exposure time. The exposure time for the video information is controlled by an optical shutter PS (not shown in FIG. 12). The exposure time for the audio information is determined by the time base length of the audio information.

In the recording system of FIG. 12, the movable contact "v" of the switch SW is connected to the fixed contact "b" of the switch SW synchronously with an opening motion of the optical shutter US (not shown in FIG. 12). The movable contact "v" remains connected to the fixed contact "b" for an adjustable interval corresponding to a shutter speed and determining a video-information recording period. While the movable contact "v" remains connected to the fixed contact "b", the voltage is applied between the electrodes Et1 and Et2 from the high voltage source V1 so that the recording of video information on the recording medium RM is executed. When the video-information recording period ends, the movable contact "v" of the switch SW is disconnected from the fixed contact "b" but is connected to the fixed contact "a" of the switch SW. The movable contact "v" remains connected to the fixed contact "a" for a predetermined interval determining an audio-information recording period. During the audio-information recording period, the voltage is applied between the electrodes Et1 and Et2 from the low voltage source V2 and the audio section of the recording system is activated so that the recording of audio information on the recording medium RM is executed. Specifically, during the audio-information recording period, the audio information is read out from the circulating memory 8 in response to a reading pulse outputted from the control circuit 9, and the light source LS is controlled in response to the readout audio information.

Figure 14:
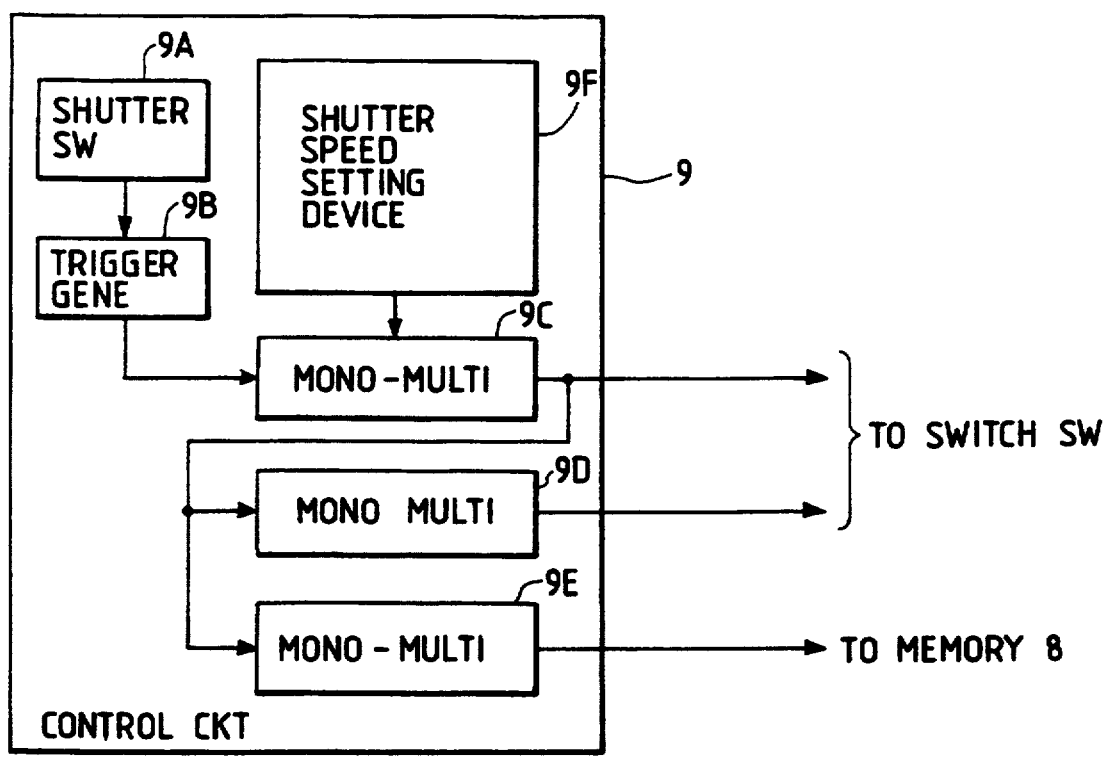
FIG. 14 is a block diagram of the control circuit of FIG. 12.

As shown in FIG. 14, the control circuit 9 includes a shutter switch 9A, a trigger pulse generator 9B, monostable multivibrators 9C, 9D, and 9E, and a shutter speed setting device 9F. The shutter switch 9A outputs a signal, which assumes a low level and a high level when the optical shutter PS is closed and opened respectively. The trigger pulse generator 9B outputs a trigger pulse to a monostable multivibrator 9C in response to a positive-going level change in the output signal from the shutter switch 9A. The monostable multivibrator 9C is triggered by a leading edge of the trigger pulse, outputting a pulse of an adjustable width which determines a video-information recording period. The output pulse from the monostable multivibrator 9C is fed to the switch SW and also the monostable multivibrators 9D and 9E. The monostable multivibrator 9D is triggered by a trailing edge of the output pulse from the monostable multivibrator 9C, outputting a pulse of a predetermined width which determines an audio-information recording period. The output pulse from the monostable multivibrator 9D is fed to the switch SW. The monostable multivibrator 9E is triggered by a trailing edge of the output pulse from the monostable multivibrator 9C, generating a short pulse which is fed to the circulating memory 8 as a reading pulse. The shutter speed setting device 9F outputs a signal, the voltage of which is varied as a function of a designated shutter speed. The output signal from the shutter speed setting device 9F is fed to a control terminal of the monostable multivibrator 9C so that the width of a pulse outputted from the monostable multivibrator 9C will depend on the designated shutter speed.

Figure 15:
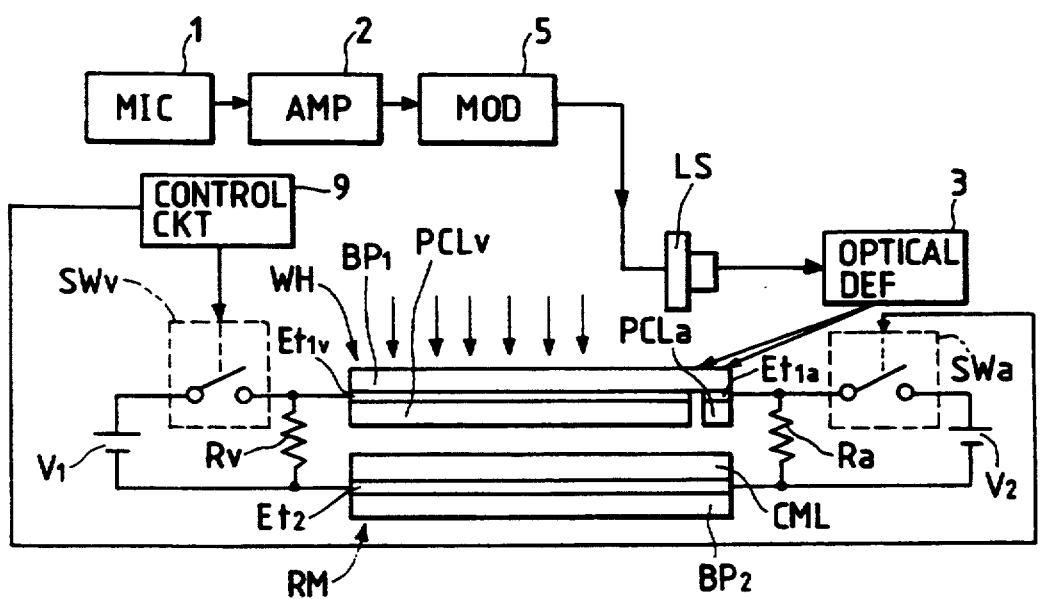
FIG. 15 is a diagram of a recording system according to an embodiment of this invention.

A recording system of FIG. 15 is similar to the recording system of FIG. 12 except for design changes described hereinafter. In the recording system of FIG. 15, the output signal from an amplifier 2 is directly fed to a modulator 5. In addition, a photoconductive layer of a writing head WH has separate segments PCLv and PCLa for video information and audio information respectively. Further, a transparent electrode of the writing head WH has separate segments Et1v and Et1a corresponding to the photoconductive layers PCLv and PCLa respectively. The transparent electrode Et1v is electrically connected to the positive terminal of a voltage source V1 via a switch SWv which is controlled by an output signal from a control circuit 9. The negative terminal of the voltage source V1 is electrically connected to an electrode Et2 of a recording medium RM. A fixed resistor Rv is electrically connected between the electrodes Et1v and Et2. The transparent electrode Et1a is electrically connected to the positive terminal of a voltage source V2 via a switch SWa which is controlled by an output signal from the control circuit 9. The negative terminal of the voltage source V2 is electrically connected to the electrode Et2 of the recording medium RM. A fixed resistor Ra is electrically connected between the electrodes Et1a and Et2.

In the recording system of FIG. 15, during a video-information recording period, the switch SWv is closed by the output signal from the control circuit 9 so that a predetermined voltage is applied between the electrodes Et1v and Et2 from the voltage source V1. The voltage applied between the electrodes Et1v and Et2 is chosen so as to enable good recording of video information into the recording medium RM. During an audio-information recording period, the switch SWa is closed by the output signal from the control circuit 9 so that a predetermined voltage is applied between the electrodes Et1a and Et2 from the voltage source V2. The voltage applied between the electrodes Et1a and Et2 is chosen so as to enable good recording of audio information into the recording medium RM. The video-information recording period and the audio-information recording period may be at least partially overlapped with each other.

Figure 16:
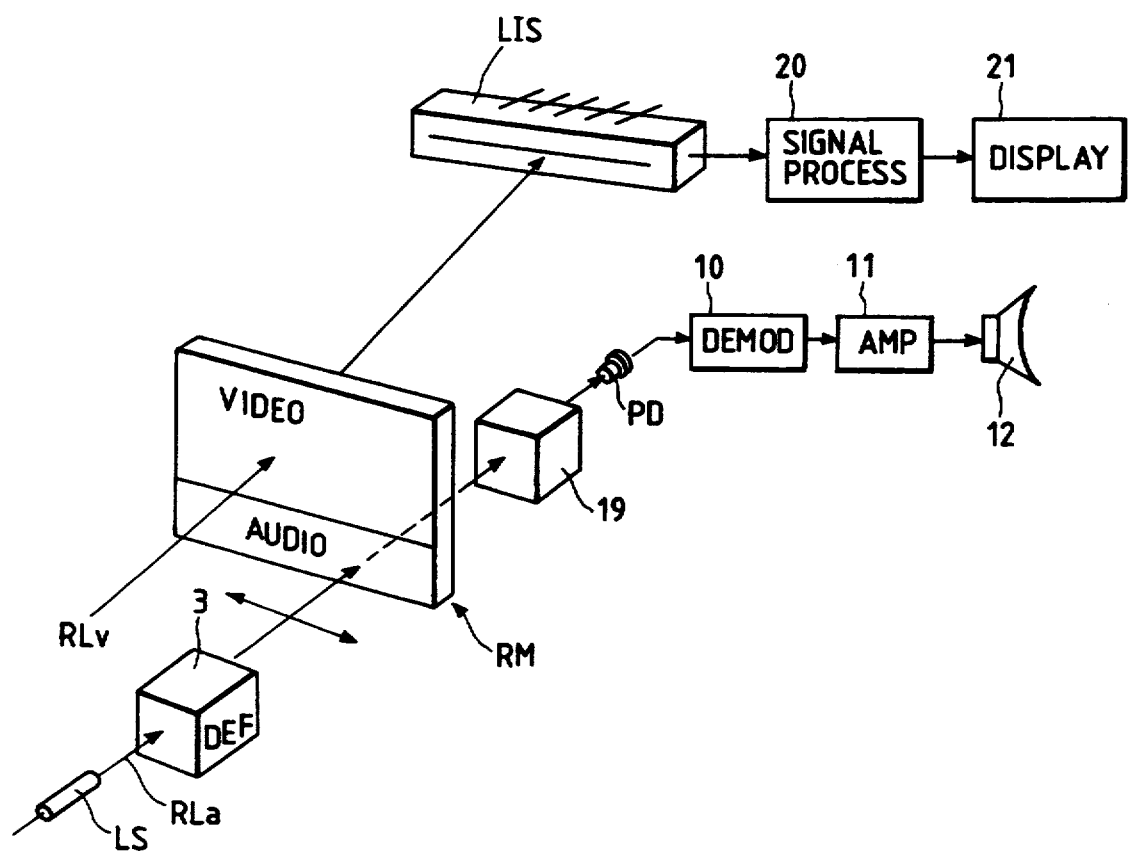
FIG. 16 is a diagram of a reproducing system according to an embodiment of this invention.

In a reproducing system of FIG. 16, a recording medium RM has separate regions storing video information and audio information respectively. A reading light beam RLv emitted from a light source (not shown) is applied to the video-information recording region of the recording medium RM. The reading light beam ELv which exits from the video-information recording region of the recording medium RM is incident to a line image sensor LIS. The video-information recording region of the recording medium RM is scanned by the reading light beam RLv in a line-by-line manner while the line image sensor LIS is moved relative to the recording medium RM in a sub scanning direction by a suitable drive mechanism (not shown). The line image sensor LIS converts the incident reading light beam RLv into a corresponding electric signal. Since the reading light beam RLv which exits from the video-information recording region of the recording medium RM is modulated in accordance with the video information stored in the video-information recording region of the recording memory RM, the electric signal outputted from the line image sensor LIS represents the video information. The output signal from the line image sensor LIS is processed by a signal processor 20 into a video signal of a given format. The video signal is fed from the signal processor 20 to a display device 21 so that the video information represented by the video signal is visualized by the display device 21.

In the reproducing system of FIG. 16, a reading light beam RLa emitted from a light source LS is deflected by an optical deflector 3 so that the audio-information recording region of the recording medium RM will be scanned by the reading light beam RLa in a predetermined format. The reading light beam RLa which exits from the audio-information recording region of the recording medium RM is incident to a photodetector PD via an optical condenser 19. The photodetector PD converts the incident reading light beam RLa into a corresponding electric signal. Since the reading light beam RLa which exits from the audio-information recording region of the recording medium RM is modulated in accordance with the audio information stored in the audio-information recording region of the recording memory RM, the electric signal outputted from the photodetector PD represents the audio information. The output signal from the photodetector PD is subjected to a demodulating process by a demodulator 10. The output signal from the demodulator 10 is fed to a loudspeaker 12 via an amplifier 11 so that the audio information represented by the output signal from the demodulator 10 is reproduced by the loudspeaker 12.

Figure 17:
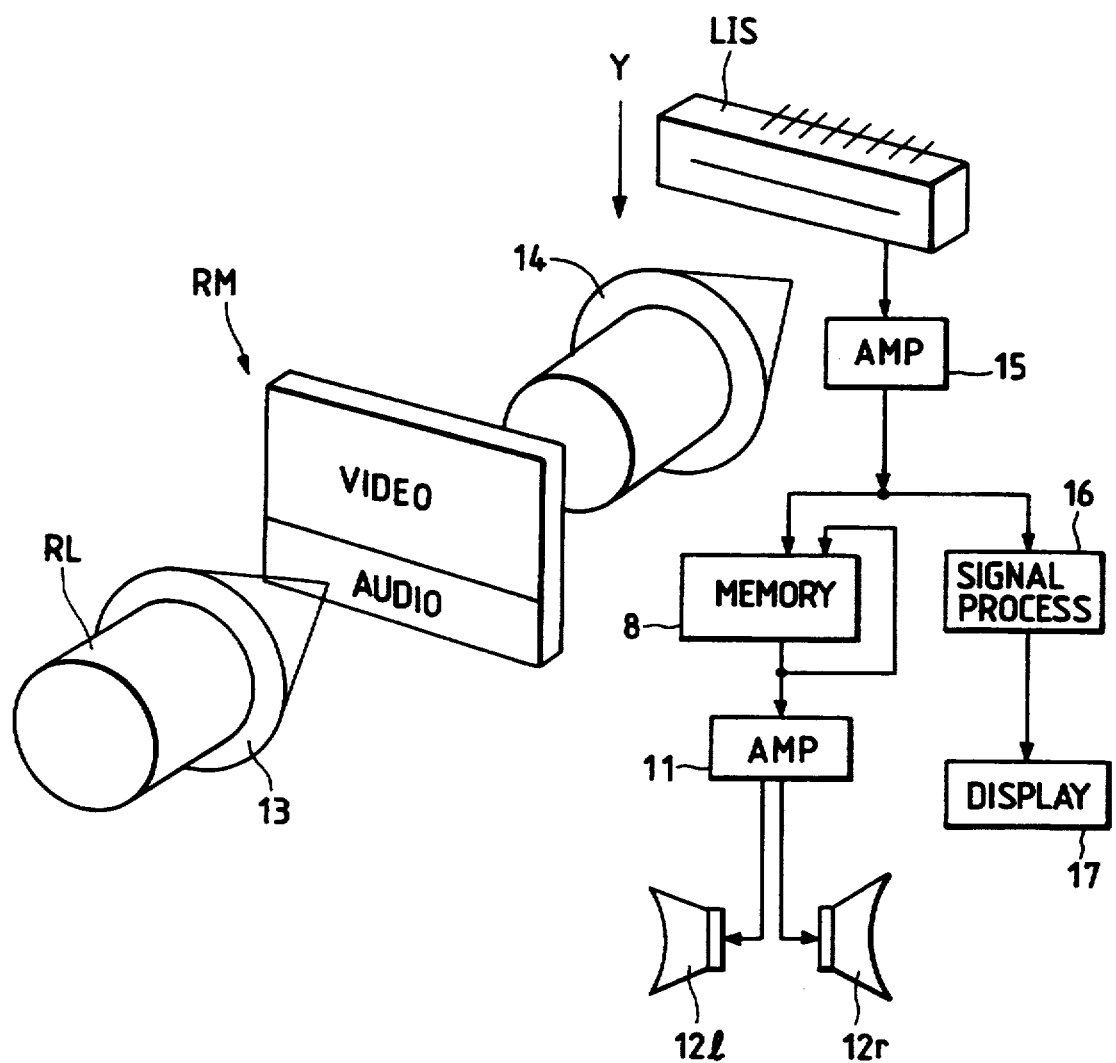
FIG. 17 is a diagram of a reproducing system according to an embodiment of this invention.

In a reproducing system of FIG. 17, a recording medium RM has separate regions storing video information and two-channel audio information respectively. Reading light RL emitted from a light source (not shown) is focused into a spot on the recording medium RM by a lens 13. The reading light RL which exits from the recording medium RM is incident to a line image sensor LIS via a lens 14. The video-information recording region and the audio-information recording region of the recording medium RM are sequentially scanned by the reading light RL in a line-by-line manner while the line image sensor LIS is moved relative to the recording medium RM in a sub scanning direction Y by a suitable drive mechanism (not shown). The line image sensor LIS converts the incident reading light beam RLv into a corresponding electric signal. Since the reading light beam RL which exits from the video-information recording region of the recording medium RM is modulated in accordance with the video information and the audio information stored in the recording memory RM, the electric signal outputted from the line image sensor LIS sequentially represents the video information and the audio information. The output signal from the line image sensor LIS is gated by a suitable device (not shown), being separated into components representing the video information and the audio information respectively. The output signal from the line image sensor LIS which represents the video information is processed by a signal processor 16 into a video signal of a given format. The video signal is fed from the signal processor 16 to a display device 17 so that the video information represented by the video signal is visualized by the display device 17. The output signal from the line image sensor LIS which represents the audio information is temporarily stored in a circulating memory 8, being read out from the circulating memory 8 and being separated into left-channel audio information and right-channel audio information. The left-channel audio information and the right-channel audio information are fed via an amplifier 11 to loudspeakers 12l and 12r, and is reproduced by the loudspeakers 12l and 12r respectively. The circulating memory 8 provides an audio-signal delay, which is chosen so as to realize good synchronization between the reproduction of video information and the reproduction of related audio information.

Figure 18:
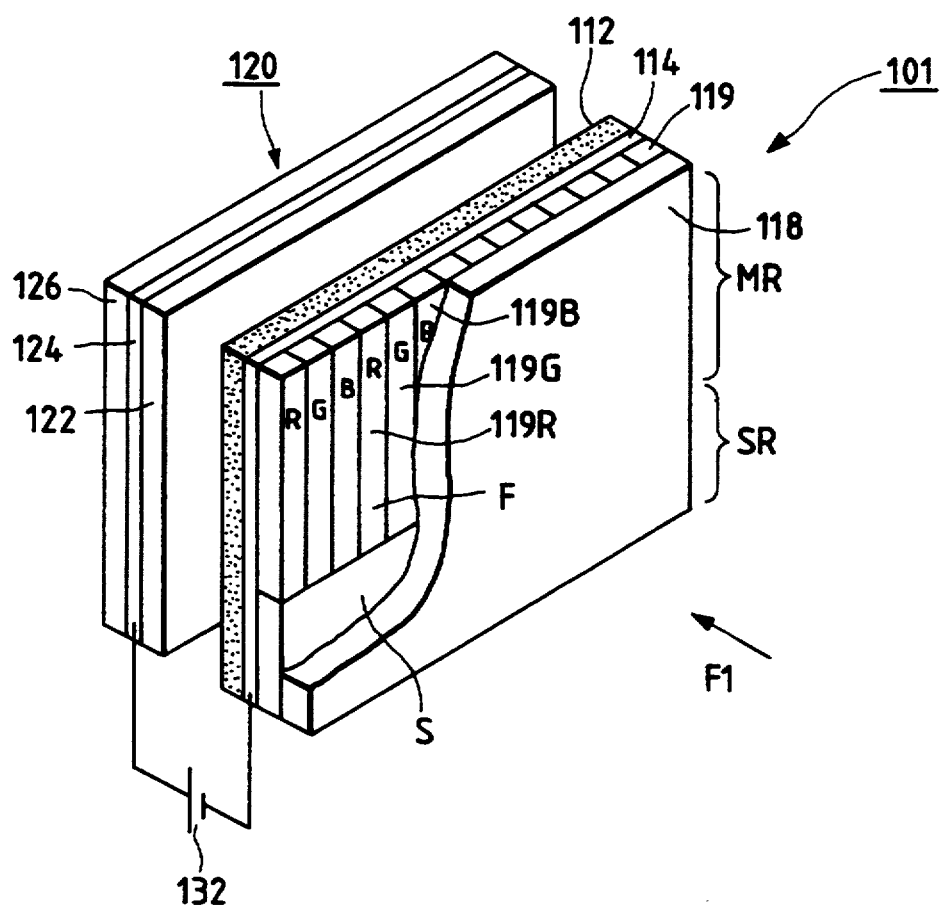
FIG. 18 is a diagram of a recording system according to an embodiment of this invention.

A recording system of FIG. 18 includes a recording medium 101 and a writing head 120. The recording medium 101 has a laminated structure of a transparent base plate 118, a filter layer 119, a transparent electrode 114, and a charge holding layer 112 which are arranged in the order. The writing head 120 has a laminated structure of a photoconductive layer 122, an electrode 124, and a base plate 126 which are arranged in the order. The photoconductive layer 122 of the writing head 120 opposes the charge holding layer 112 of the recording medium 101 with a predetermined gap formed therebetween. The recording medium 101 is divided into regions MR and SR which correspond to video information and audio information respectively. The filter layer 119 is divided into a filter region F and a non-filter region S which correspond to the video-information region MR and the audio-information region SR respectively. The filter region F includes a color, separation stripe filter composed of a recurrent arrangement of red, green, and blue stripes 119R, 119G, and 119B. The non-filter region S is transparent.

In the recording system of FIG. 18, light representing an image of an object (not shown) is incident to the video-information region MR of the recording medium 101 via a lens (not shown). The video-information light travels along a direction F1, successively passing through the transparent base plate 118, the color separation filter F, the transparent electrode 114, and the charge holding layer 112 and then reaching the photoconductive layer 122. Thus, the image on the photoconductive layer 122 has a color-separated arrangement determined by the design of the color separation filter F. An electric power source 132 is connected between the electrodes 114 and 124, causing a space discharge between the photoconductive layer 122 of the writing head 120 and the charge holding layer 112 of the recording medium 101 in response to the color-separated image on the photoconductive layer 122, generating a charge latent image on the charge holding layer 112 which corresponds to the color-separated image on the photoconductive layer 122. In this way, the video information is recorded on the recording medium 101.

In the recording system of FIG. 18, a light beam representing audio information is applied to the audio-information region SR of the recording medium 101. The light beam is deflected by a suitable device (not shown) to scan the audio-information region SR. The audio-information light beam successively passes through the transparent base plate 118, the non-filter region S of the filter layer 119, the transparent electrode 114, and the charge holding layer 112 before reaching the photoconductive layer 122. A space discharge is caused between the photoconductive layer 122 of the writing head 120 and the charge holding layer 112 of the recording medium 101 in response to the audio-information light beam, generating charges on the charge holding layer 112 which are distributed in response to the audio information represented by the light beam. In this way, the audio information is recorded on the recording medium 101.

Figure 19:
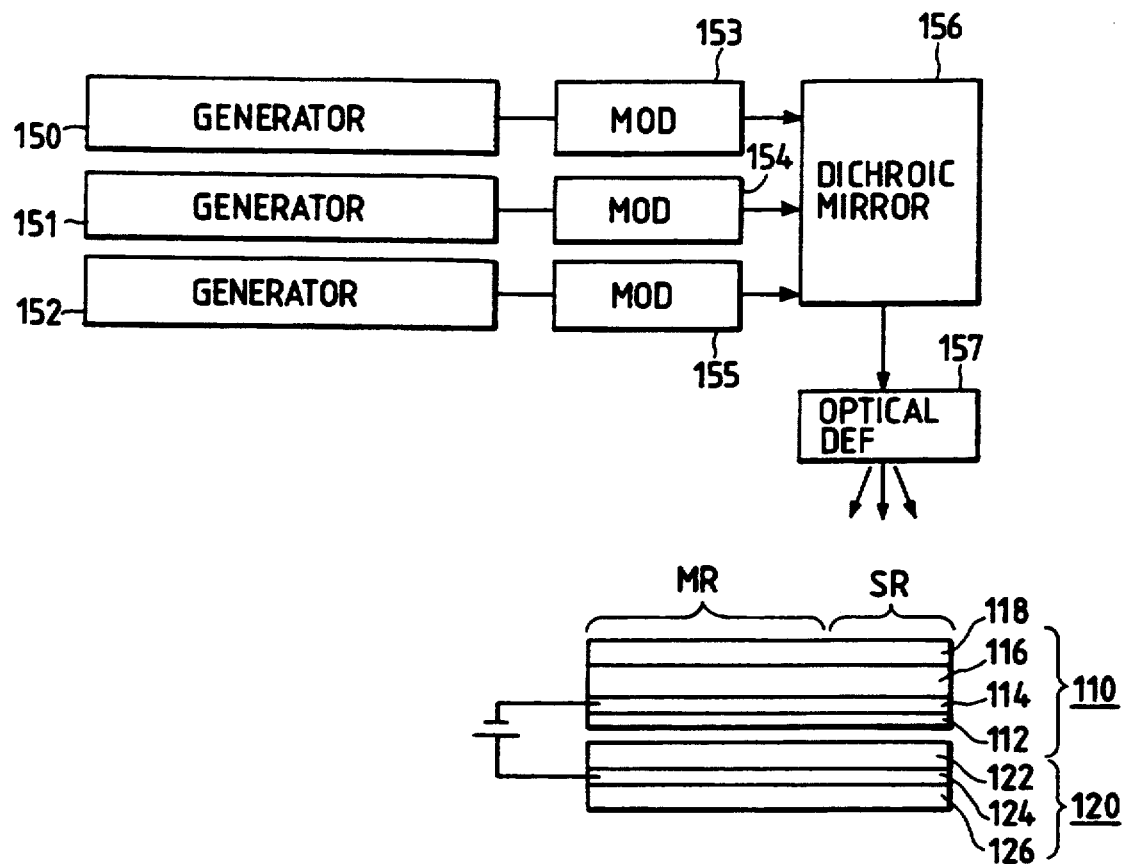
FIG. 19 is a diagram of a recording system according to an embodiment of this invention.
Figure 20:
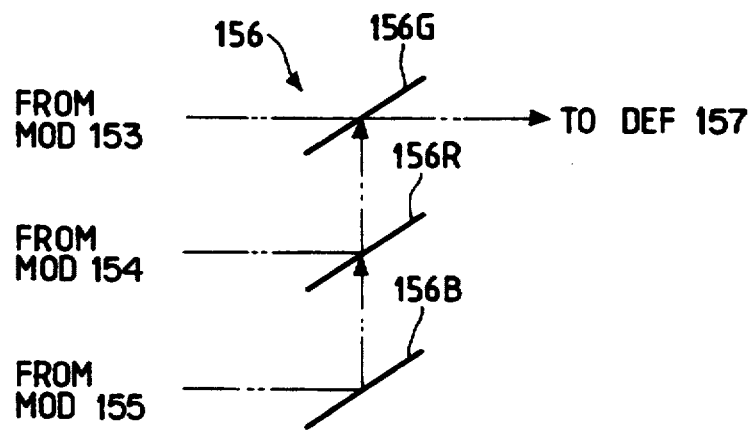
FIG. 20 is a diagram of the dichroic mirror group of FIG. 19.

A recording system of FIG. 19 is similar to the recording system of FIG. 18 except for design changes described hereinafter. In the recording system of FIG. 19, a recording medium 110 has a laminated structure of a transparent base plate 118, a filter layer 116, a transparent electrode 114, and a charge holding layer 112 which are arranged in the order. The filter layer 116 is formed with a color separation stripe filter which extends over both of a video-information recording region MR and an audio-information recording region SR. The color separation stripe filter includes a recurrent arrangement of red, green, and blue stripes. The recording system of FIG. 19 includes generators 150, 151, and 152. The generator 150 outputs a signal representing right-channel audio information. The generator 151 outputs a signal representing left-channel audio information. The generator 152 outputs a signal representing search information. The output signals from the generators 150, 151, and 152 are fed to optical modulators 153, 154, and 155 respectively. The optical modulators 153, 154, and 155 emit light beams, the intensities of which are modulated in accordance with the information represented by the output signals from the generators 150, 151, and 152 respectively. The light beams are applied to a dichroic mirror group 156. As shown in FIG. 20, the dichroic mirror group 156 includes color separating surfaces 156R and 156B which reflect red light and blue light respectively. The dichroic mirror group 156 also includes a color separating surface 156G which conducts only green light. The light emitted from the optical modulator 155 is incident to the color separating surface 156B, and only blue components of the light are reflected by the color separating surface 156B toward the color separating surface 156R. The blue components pass through the color separating surface 156R, and are then reflected by the color separating surface 156G toward an optical deflector 157. The light emitted from the optical modulator 154 is incident to the color separating surface 156R, and only red components of the light are reflected by the color separating surface 156R toward the color separating surface 156G. The red components are reflected by the color separating surface 156G toward the optical deflector 157. The light emitted from the optical modulator 153 is incident to the color separating surface 156G, and only green components of the light pass through the color separating surface 156G and then reach the optical deflector 157. The blue light representing the search information, the red light representing the left-channel audio information, and the green light representing the right-channel audio information are combined into a single light beam which is incident to the optical deflector 157. In this way, the search information, the left-channel audio information, and the right-channel audio information are multiplexed in a color-division manner or a frequency-division manner. As shown in FIG. 19, the optical deflector 157 deflects the incident light beam and applies the light beam to the audio-information region SR of the recording medium 101, enabling the light beam to scan the audio-information region SR.

Figure 21:
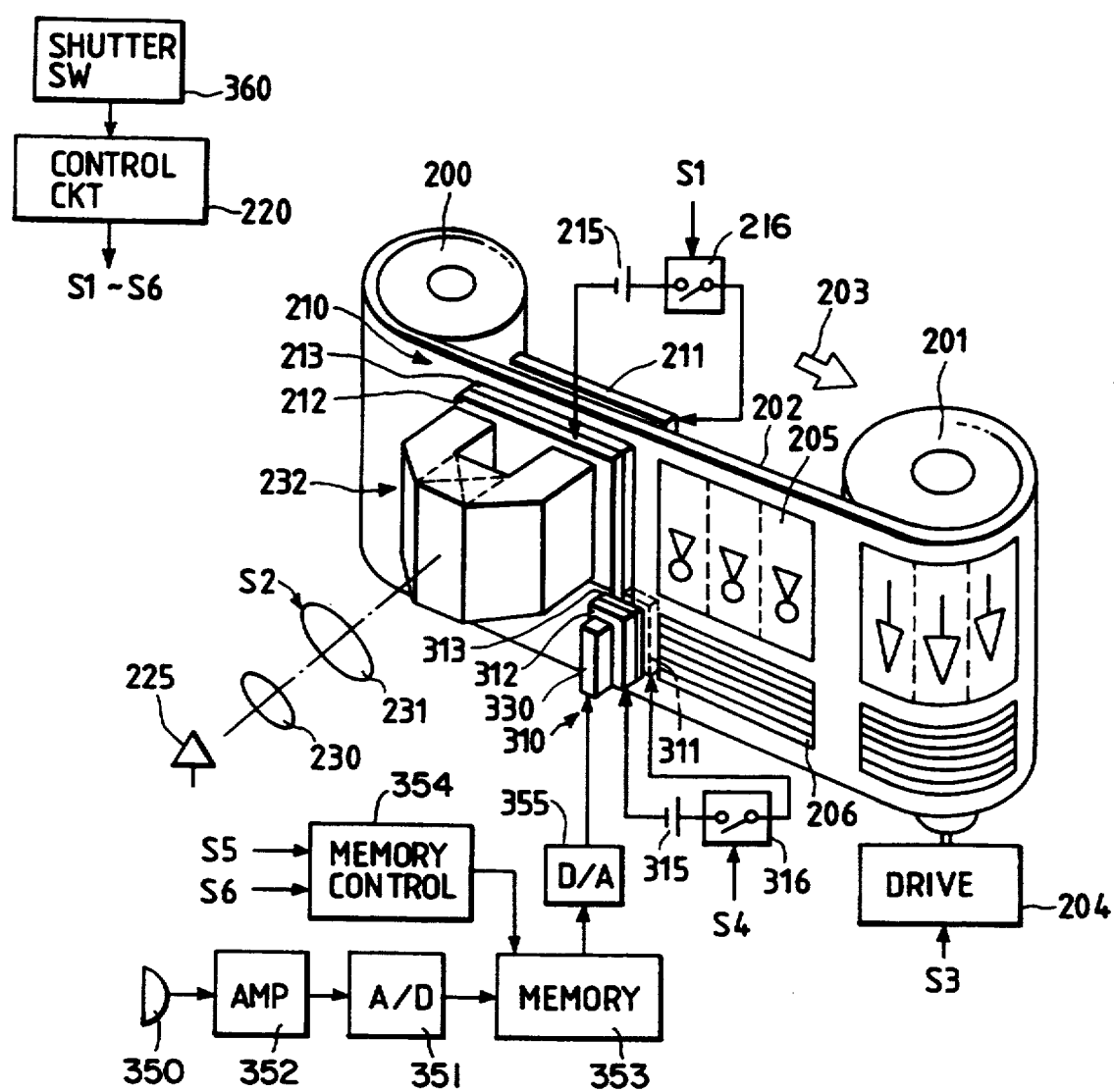
FIG. 21 is a diagram of a recording system according to an embodiment of this invention.

A recording system of FIG. 21 includes a pair of rollers 200 and 201 on which a belt-like recording medium 202 is wound. A winding driver 204 connected to the roller 201 serves to move the recording medium 202 step by step in a direction 203. The winding driver 204 is controlled by an output signal S3 from a control circuit 220. An upper part of the recording medium 202 has main-information recording regions 205 each composed of segments for storing red, green, and blue video information. A lower part of the recording medium 202 has sub-information recording regions 206. The recording medium 202 is made of charge holding material or photo-modulation material.

In the recording system of FIG. 21, a main-information recording device includes a writing head 210 and a plate electrode 211 which are located at opposite sides of the recording medium 202 respectively and which are normally aligned with one of the main-information recording regions 205 of the recording medium 202. The writing head 210 has a laminated structure of a transparent layer electrode 212 and a photoconductive layer 213. The photoconductive layer 213 opposes the recording medium 202. The positive terminal of adc power source 215 is connected to the electrode 211 via a switch 216. The negative terminal of the dc power source 215 is connected to the electrode 212. The switch 216 is controlled by an output signal S1 from the control circuit 220. When the switch 216 is closed by the control signal S1, a predetermined electric field is generated between the electrodes 211 and 212.

In the recording system of FIG. 21, a lens 230, an optical shutter 231, an optical color separator 232, and the writing head 210 are arranged in the order along a direction of travel of light representing a scene of an object 225, the image of which is to be recorded. The optical shutter 231 is controlled by an output signal S2 from the control circuit 220. When the optical shutter 231 is opened by the control signal S2, the light representing the scene of the object 225 travels to the optical color separator 232 via the lens 230. The optical color separator 232 separates the incident light into red light, green light, and blue light which form a red image, a green image, and a blue image of the object 225 on the writing head 210 respectively. The photoconductive layer 213 is exposed to the red image, the green image, and the blue image of the object 225 via the transparent electrode 212.

Under conditions where the optical shutter 231 is opened and the switch 216 is closed, the three color images of the object 225 are formed on the photoconductive layer 213 and the electric field is generated between the electrodes 211 and 212. The photoconductive layer 213 is exposed to the electric field, and the electric resistance of the photoconductive layer 213 varies with the three color images of the object 225. Thus, a two-dimensional distribution of the electric field in a gap between the photoconductive layer 213 and the recording medium 202 varies in accordance with the three color images of the object 225. In the case where the recording medium 202 is made of charge holding material, a space discharge occurs across the gap between the photoconductive layer 213 and the recording medium 202 in response to the electric field, so that charge latent images corresponding to the three color images are formed on the main-information recording region 205 of the recording medium 202. In the case where the recording medium 202 is made of photomodulation material, optical conditions of the recording medium 202 are varied in response to the electric field, so that the information corresponding to the three color images are transferred from the electric field to the recording medium 202. In this way, the video information is recorded on the main-information recording region 205 of the recording medium 202.

In the recording system of FIG. 21, a sub-information recording device includes a writing head 310 and a plate electrode 311 which are located at opposite sides of the recording medium 202 respectively and which are normally aligned with one of the sub-information recording regions 206 of the recording medium 202. The writing head 310 has a laminated structure of a transparent layer electrode 312 and a photoconductive layer 313. The photoconductive layer 318 opposes the recording medium 202. The positive terminal of adc power source 815 is connected to the electrode 311 via a switch 316. The negative terminal of the dc power source 315 is connected to the electrode 312. The switch 316 is controlled by an output signal S4 from the control circuit 220. When the switch 316 is closed by the control signal S4, a predetermined electric field is generated between the electrodes 311 and 312. The writing head 310 includes an optical modulator 330 having an LED array which emits a plurality of light beams toward the photoconductive layer 313. As will be described later, the light beams emitted from the optical modulator 330 are modulated in accordance with audio information. Segments of the LED array are aligned along a line perpendicular to the medium moving direction 203 and parallel to the surface of the recording medium 202. The photoconductive layer 313 is exposed to the audio-information light beams emitted from the optical modulator 330. Under conditions where the switch 316 is closed, the electric field is generated between the electrodes 311 and 312. The photoconductive layer 313 is exposed to the electric field, and the electric resistance of the photoconductive layer 313 varies with the audio-information light beams. Thus, a two-dimensional distribution of the electric field in a gap between the photoconductive layer 313 and the recording medium 202 varies in accordance with the audio-information light beams. In the case where the recording medium 202 is made of charge holding material, a space discharge occurs across the gap between the photoconductive layer 313 and the recording medium 202 in response to the electric field, so that charges representing the audio information are generated on the sub-information recording region 206 of the recording medium 202. In the case where the recording medium 202 is made of photomodulation material, optical conditions of the recording medium 202 are varied in response to the electric field, so that the audio information is transferred from the electric field to the recording medium 202. In this way, the audio information is recorded on the sub-information recording region 206 of the recording medium 202. Recording tracks parallel to the medium moving direction 203 are formed in the sub-information recording region 206 in correspondence with the respective audio-information light beams.

In the recording system of FIG. 21, a microphone 350 outputs an analog audio signal which is fed to an analog-to-digital converter 851 via an amplifier 352. The analog audio signal is converted by the analog-to-digital converter 351 into a corresponding digital audio-information signal (audio-information data). The digital audio-information signal is fed to a circulating memory 858. A memory controller 354 includes an address generator and a read/write signal generator, generating an address signal, a reading pulse, and a writing pulse in response to output signals S5 and S6 from the control circuit 220. The address signal, the reading pulse, and the writing pulse are fed to the circulating memory 353. The circulating memory 353 circularly memorizes a predetermined time segment of the audio-information data in response to a writing pulse fled from the memory controller 354. The audio-information data are read out from the circulating memory 353 in response to a reading pulse outputted from the memory controller 354, and the readout audio-information data are fed to a digital-to-analog converter 855. The audio-information data are converted by the digital-to-analog converter 355 into a corresponding analog audio-information signal, which is fed to the optical modulator 310. The light beams emitted from the optical modulator 310 are modulated in accordance with the analog audio-information signal.

The recording system of FIG. 21 operates as follows. When a shutter switch 360 connected to the control circuit 220 is actuated, the control circuit 220 outputs control pulses S1, S2, and S5. The optical shutter 231 is opened by the control pulse S2. The switch 216 is closed by the control pulse S1. As a result, information corresponding to color-separated images of the object 225 is recorded on a main-information recording region 205 of the recording medium 202. The memory controller 354 suspends the writing of data into the circulating memory 353 in response to the control pulse S5. Thus, the circulating memory 353 continues to hold a predetermined time length of audio information which occurs before the actuation of the shutter switch 860. When a predetermined time elapses since the moment of the actuation of the shutter switch 360, the control circuit 220 outputs a control pulse S3. The winding driver 204 is activated in response to the control pulse S3, rotating the roller 201 and winding the recording medium 202 by a length corresponding to one picture. A portion of the recording medium 202 which extends between the rollers 200 and 201 is moved along the direction 203. As a result, a new main-information recording region 205 of the recording medium 202 moves into alignment with the main-information writing head 210. During the winding of the recording medium 202, the control circuit 220 outputs control pulses S4 and S6. The switch 316 is closed by the control pulse S4. The memory controller 354 responds to the control pulse S6, enabling audio-information data to be read out from the circulating memory 353. Thus, during the winding of the recording medium 202, the audio information is recorded on the sub-information recording region 206 of the recording medium 202.

Figure 22:
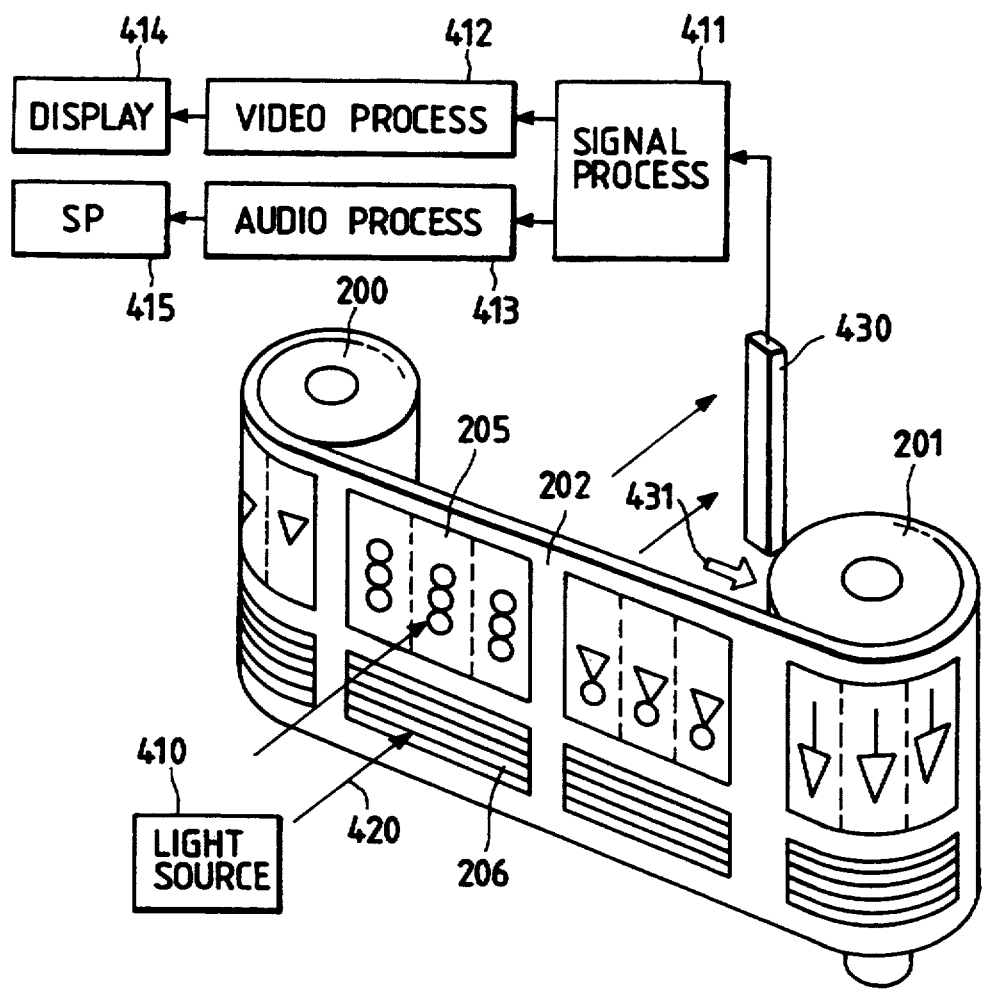
FIG. 22 is a diagram of a reproducing system according to an embodiment of this invention.
Figure 23:
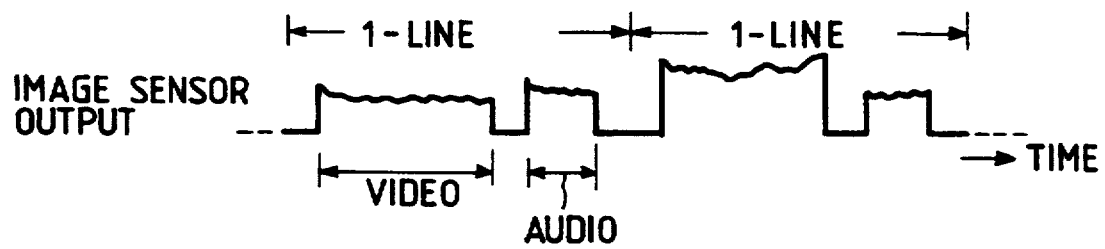
FIG. 23 is a time-domain diagram showing the waveform of the output signal from the line image sensor of FIG. 22.

FIG. 22 shows a reproducing system for use in combination with the recording system of FIG. 21. The reproducing system of FIG. 22 includes a light source 410 which applies reading light 420 to a main-information recording region 205 and a sub-information recording region 206 of a recording medium 202. The reading light 420 passes through the recording medium 202. When the reading light 420 passes through the recording medium 202, the reading light 420 is modulated in accordance with video information and audio information stored in the main-information recording region 205 and the sub-information recording region 206 of the recording medium 202. Thus, the reading light 420 which exits from the recording medium 202 represents the video information and the audio information. The reading light 420 which exits from the recording medium 202 is incident to a line image sensor 430, being converted by the line image sensor 430 into a corresponding electric signal which represents the video information and the audio information. To two-dimensionally scan the recording medium 202 by the reading light 420, the recording medium 202 is moved by a drive device (not shown) relative to the light source 410 and the line image sensor 430 in a direction 431 which extends perpendicular to the longitudinal direction of the line image sensor 430. As shown in FIG. 23, during each one-line period, the output signal from the line image sensor 430 sequentially represents the video information and the audio information. The output signal from the line image sensor 430 is processed by a signal processor 411. Specifically, the signal processor 411 separates the output signal from the line image sensor 480 into video-information components and audio-information components. The signal processor 411 feeds the video-information components to a video processor 412. The signal processor 411 feeds the audio-information components to an audio processor 413. The video processor 412 converts the video-information components into a corresponding video signal of a predetermined format. The video signal is fed to a display device 414 so that the video information is reproduced on the display device 414. The audio processor 412 converts the audio-information components into a corresponding normal audio signal. The audio signal is fed to a loudspeaker 415 so that the audio information is reproduced by the loudspeaker 415.

Figure 24:
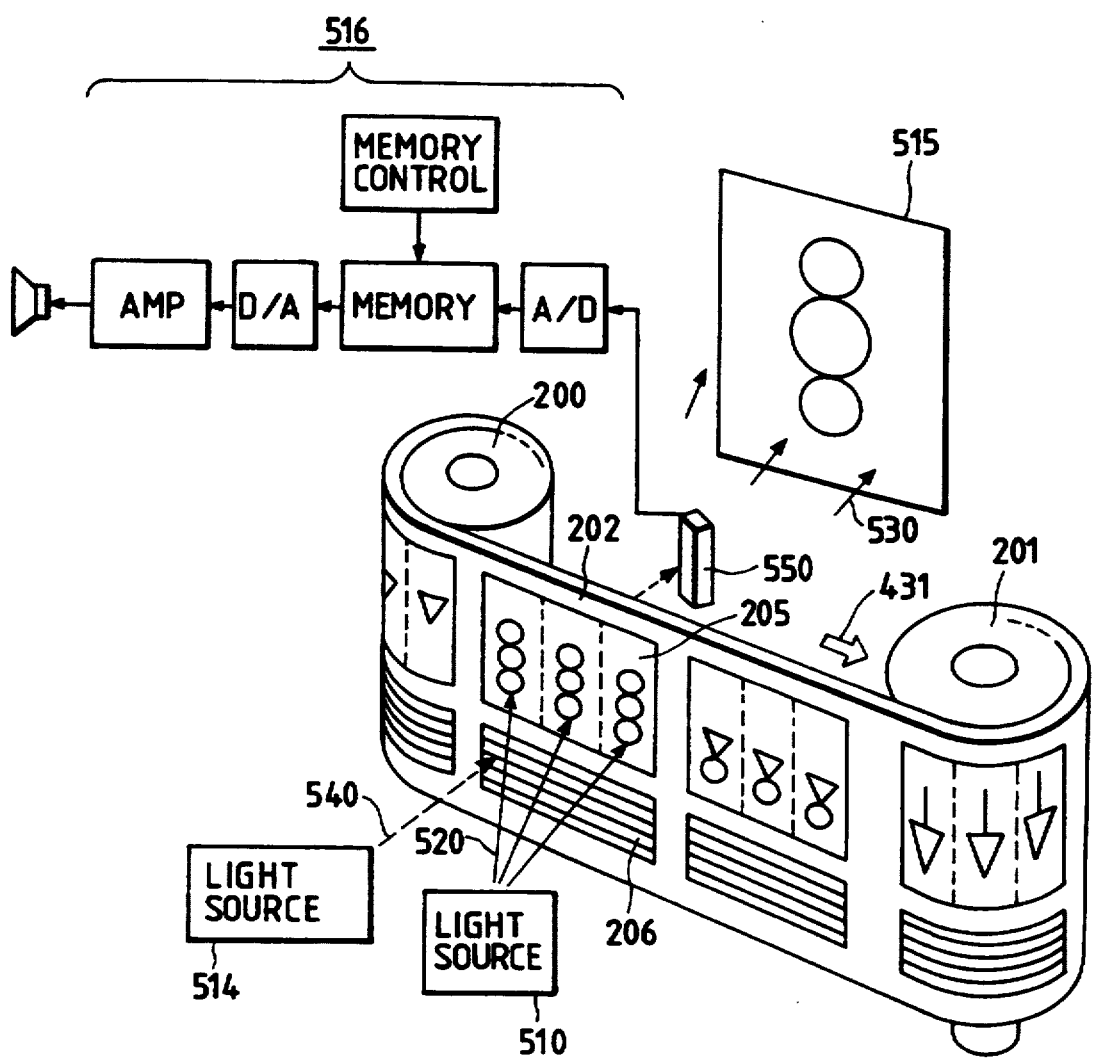
FIG. 24 is a diagram of a reproducing system according to an embodiment of this invention.

A reproducing system of FIG. 24 is similar to the reproducing system of FIG. 22 except for design changes described hereinafter. In the reproducing system of FIG. 24, a main light source 510 applies main-information reading light 520 to one complete main-information recording region 205 of a recording medium 202. The main-information reading light 520 passes through the main-information recording region 205 of the recording medium 202. When the main-information reading light 520 passes through the main-information recording region 205, video information stored in the main-information recording region 205 is transferred to the video information reading light 520. The main-information reading light 520 which exits from the recording medium 202 is converted by a three-color synthesizing optical device (not shown) into composite light 530, which is applied to a screen 515. As a result, an image corresponding to the video information is projected on the screen 515.

In the reproducing system of FIG. 24, while the recording medium 202 is moved along a direction 431, a sub light source 514 applies sub-information reading light 540 to a sub-information recording region 206 of the recording medium 202 so that the sub-information reading light 540 two-dimensionally scans the sub-information recording region 206. The sub-information reading light 540 passes through the sub-information recording region 206 of the recording medium 202. When the sub-information reading light 540 passes through the sub-information recording region 206 of the recording medium 202, the sub-information reading light 540 is modulated in accordance with audio information stored in the sub-information recording region 206 of the recording medium 202. Thus, the sub-information reading light 540 which exits from the recording medium 202 represents the audio information. The sub-information reading light 540 which exits from the recording medium 202 is incident to a line image sensor 550, being converted by the line image sensor 550 into a corresponding electric signal which represents the audio information. The output signal from the line image sensor 550 is processed by an audio processor 516.

What is claimed is:

1. An information recording and reproducing apparatus comprising means for generating light containing information to be recorded; photo-to-electric converting means for converting the light into a charge latent image, the photo-to-electric converting means including a photoconductive member exposed to the light; means for recording information corresponding to the charge latent image on a recording medium; and means for reproducing the information from the recording medium;

the improvement comprising:

means for intermittently moving the recording medium;

means for generating a first writing light representative of video information;

means for generating a second writing light representative of audio information;

first recording means for two-dimensionally and simultaneously recording the video information on a first region of the recording medium by applying the first writing light to the photoconductive member of the first region when the recording medium is not moved by the moving means;

second recording means, separate from the first recording means, for recording the audio information on a second region of the recording medium in a scanning process by applying the second writing light to the photoconductive member of the second region when the recording medium is moved by the moving means, the second region being different from the first region;

means for applying a first electric field having a first level to the photoconductive member and the recording medium when the first recording means records the video information on the recording medium;

means for applying a second electric field having a second level to the photoconductive member and the recording medium when the second recording means records the audio information on the recording medium, the second level of said second electric field being lower than the first level of said first electric field;

means for applying a reading light beam to the first and second regions of the recording medium;

the recording medium including a photo-modulation member for modulating the reading light beam in accordance with the video information and the audio information recorded on the first and second regions of the recording medium;

common means for reproducing the video information and the audio information from the recording medium in response to the modulated reading light beam when the recording medium is moved by the moving means, the common means including a line image sensor for sensing the modulated reading light beam and photoelectrically converting the sensed modulated reading light beam into a corresponding electric signal.

2. An information recording and reproducing apparatus comprising means for generating light containing information to be recorded; photo-to-electric converting means for converting the light into a charge latent image, the photo-to-electric converting means including a photoconductive member exposed to the light; means for recording information corresponding to the charge latent image on a recording medium; and means for reproducing the information from the recording medium;

the improvement comprising:

means for intermittently moving the recording medium;

means for generating a first writing light representative of video information;

means for generating a second writing light representative of audio information;

first recording means for two-dimensionally and simultaneously recording the video information on a first region of the recording medium by applying the first writing light to the photoconductive member of the first region when the recording medium is not moved by the moving means;

second recording means, separate from the first recording means, for recording the audio information on a second region of the recording medium in a scanning process by applying the second writing light to the photoconductive member of the second region when the recording medium is moved by the moving means, the second region being different from the first region;

means for applying a first electric field having a first level to the photoconductive member and the recording medium when the first recording means records the video information on the recording medium;

means for applying a second electric field having a second level to the photoconductive member and the recording medium when the second recording means records the audio information on the recording medium, the second level of said second electric field being lower than the first level of said first electric field;

means for applying a reading light beam to the first and second regions of the recording medium;

the recording medium including a photo-modulation member for modulating the reading light beam in accordance with the video information and the audio information recorded on the first and second regions of the recording medium, the photo-modulation member comprising a complex film of high molecular material and liquid crystal material;

common means for reproducing the video information and the audio information from the recording medium in response to the modulated reading light beam when the recording medium is moved by the moving means, the common means including a line image sensor for sensing the modulated reading light beam and photoelectrically converting the sensed modulated reading light beam into a corresponding electric signal.

* * * * *